United States Patent [19]

Stulik

[11] Patent Number: 5,370,444
[45] Date of Patent: Dec. 6, 1994

[54] ADJUSTABLE CUSHION

[75] Inventor: Edward Stulik, Roseville, Calif.

[73] Assignee: Sears Manufacturing Company, Davenport, Iowa

[21] Appl. No.: 944,059

[22] Filed: Sep. 11, 1992

[51] Int. Cl.$^5$ ............................................. A47C 3/00
[52] U.S. Cl. ......................... 297/284.11; 297/284.9; 297/337; 297/452.62; 5/481; 5/653
[58] Field of Search ................ 297/452.48, 452.62, 297/DIG. 1, 284.1, 337, 284.11, 284.9; 5/481, 448, 468, 465, 653

[56] References Cited

U.S. PATENT DOCUMENTS

| | | |
|---|---|---|
| 2,738,835 | 3/1956 | Eames ........................... 297/452.48 |
| 2,835,906 | 5/1958 | Robbins ................................. 5/465 |
| 3,574,401 | 4/1971 | Lehner . |
| 3,720,441 | 3/1973 | Corchran . |
| 3,802,737 | 4/1974 | Mertens . |
| 4,164,356 | 8/1979 | Knight . |
| 4,231,615 | 11/1980 | Griffiths . |
| 4,247,347 | 1/1981 | Lischer et al. . |
| 4,247,348 | 1/1981 | Lischer et al. . |
| 4,264,386 | 4/1981 | Sears, Jr. et al. . |
| 4,287,143 | 9/1981 | Sears et al. . |
| 4,370,769 | 2/1983 | Herzig et al. . |
| 4,401,343 | 8/1983 | Schmidt . |
| 4,408,802 | 10/1983 | Adomet et al. . |
| 4,459,704 | 7/1984 | Sears et al. . |
| 4,484,782 | 11/1984 | Larson . |
| 4,555,137 | 11/1985 | Göldner . |
| 4,607,887 | 8/1986 | Vail . |
| 4,752,982 | 6/1988 | Jones et al. . |
| 4,767,155 | 8/1988 | Kousaka et al. . |
| 4,773,703 | 9/1988 | Krügener et al. . |
| 4,804,221 | 2/1989 | Saiki . |
| 4,883,318 | 11/1989 | Adachi . |
| 4,913,491 | 4/1990 | Mizuno et al. . |
| 5,026,116 | 6/1991 | Dal Monte . |
| 5,027,458 | 7/1991 | Osczevski et al. ................ 5/481 X |
| 5,081,728 | 1/1992 | Skinner ................................. 5/465 |
| 5,086,529 | 2/1992 | DeGroot ............................... 5/465 |
| 5,115,527 | 5/1992 | Medley ............................ 5/468 X |

FOREIGN PATENT DOCUMENTS

| | | | |
|---|---|---|---|
| 729250 | 7/1932 | France ................................. 5/481 |
| 526407 | 5/1955 | Italy ..................................... 5/481 |
| 247914 | 12/1990 | Japan . |
| 863014 | 3/1961 | United Kingdom .................. 5/481 |

Primary Examiner—Peter M. Cuomo
Assistant Examiner—Jerry Redman
Attorney, Agent, or Firm—Niro, Scavone, Haller & Niro

[57] ABSTRACT

An extendable and collapsible seat cushion manufactured from a unitary piece of foam. Channels are molded into the foam perpendicular to the length of the seat to allow for compression of the overall length of the seat cushion. Further, channels may be molded into the foam in a direction parallel to the length of the seat cushion to allow for compression of the seat cushion in the lateral direction as well. The channels have angular recesses near the surface of the cushion to provide a home for compression hinges created by connective foam and cloth disposed between segments of the cushion. A telescoping support frame is provided to assist in the compression and extending of the seat cushion. This support frame may be telescoped manually or with assistance by power.

14 Claims, 3 Drawing Sheets

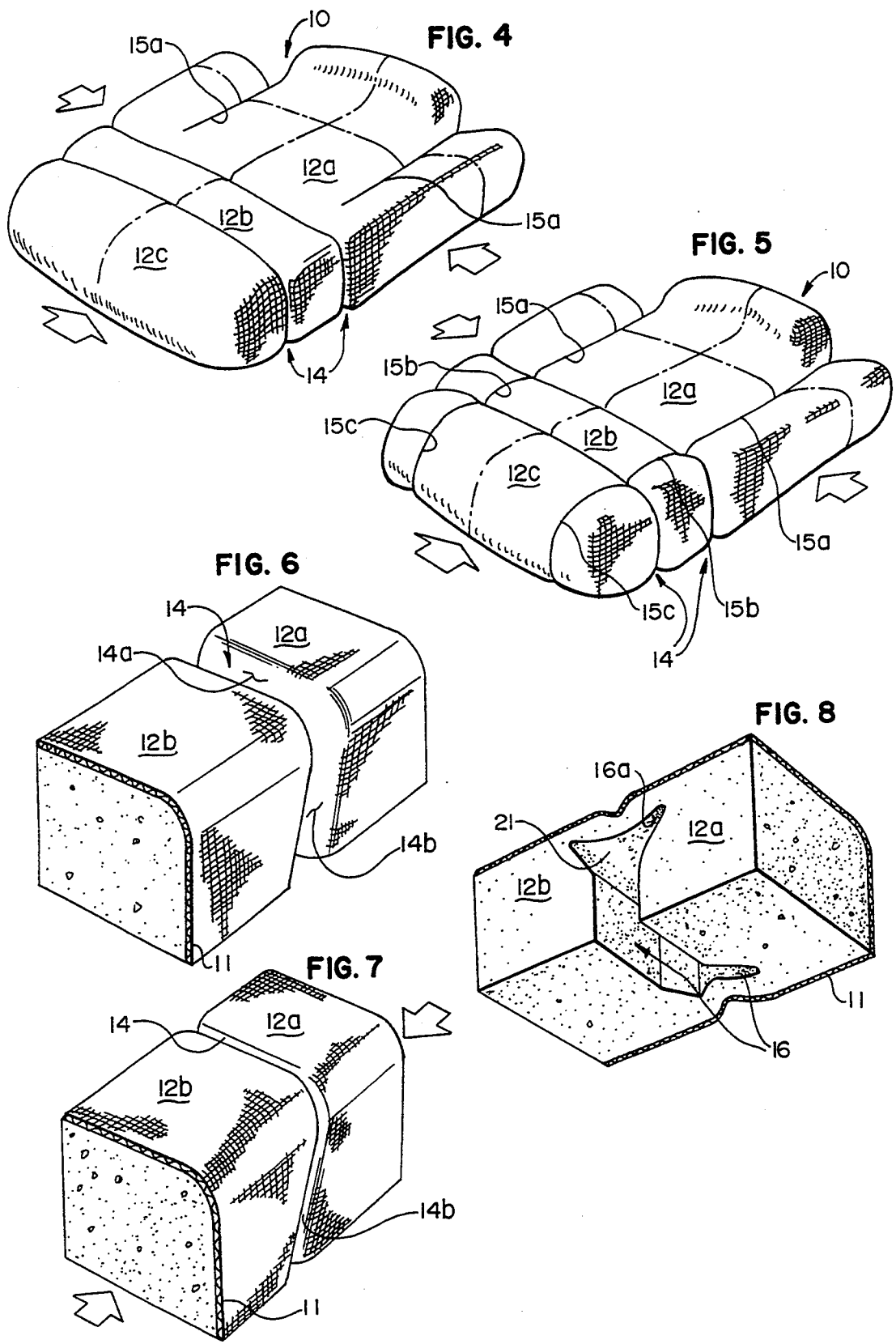

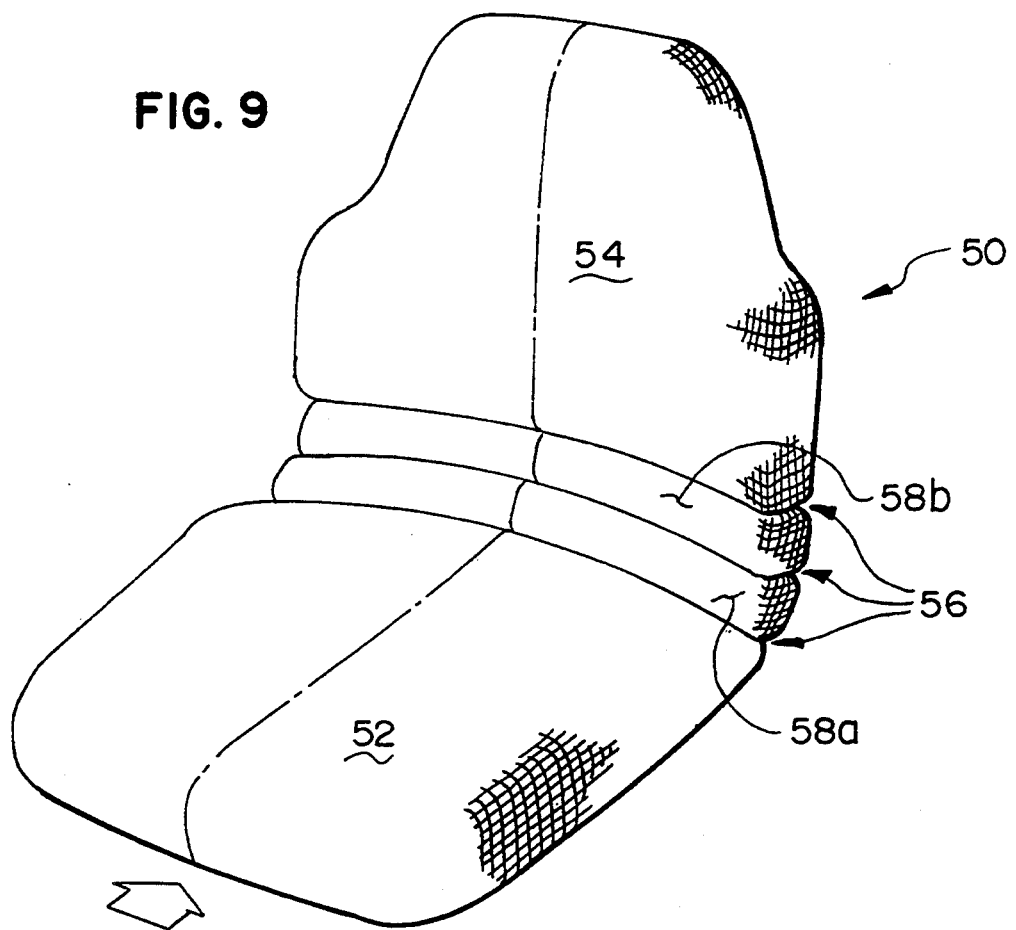

ADJUSTABLE CUSHION

BACKGROUND OF THE INVENTION

The present invention is relates generally to seating cushions. More specifically, the present invention relates to a cushion that may be extended or collapsed to accommodate operators of different body sizes.

It is desirable in the cushion art, particularly vehicle seating cushions, to provide a cushion that is adjustable to conform with the particular size of the occupant. It is also desirable to have a seat of a shape and size that is comfortable to that particular user. For example, taller persons often prefer to have a backrest that is longer to accommodate the longer trunk of their body. Further, a longer seat is desired to conform with their longer legs. On the other hand, shorter persons may find such a longer and higher seat uncomfortable. Alternatively, a person may desire a longer seat yet prefer a lower backrest and vice versa. Thus, there is a need for adjustable seat and backrest cushions that may be easily, simply and quickly adjusted as well as being comfortable and aesthetically pleasing to the eye.

To solve this problem, it is known in the art to employ individual cushion members where the distance between such members is varied to adjust the overall length of the entire cushion. These elements are often upholstered and arranged transversely relative to one another along the longitudinal length of the seat or backrest. It is also known in the art to string together a series of upholstered elements. In such a cushion, individual elements are serially strung together with connective material disposed therebetween. For Example, U.S. Pat. Nos. 4,247,347; 4,247,348; 4,264,386; 4,287,143; 4,559,094; and 4,459,704 disclose an apparatus and method of manufacture for the construction of cloth covered cushion articles or forming of cloth as an upholstery for cushioned articles.

The foregoing prior art adjustable seat cushions provide extendibility and collapsibility to conform the seat cushion to the desired size, however they have undesirable drawbacks. The known prior art extendable seat cushions require multiple pieces of cushion elements which must be connected to one another. This requires extensive cutting and sewing of parts which complicates manufacture. In certain prior art extendable cushions that have cushion elements that are merely separated from one another to increase the overall length of the cushion, undesirable gaps will result.

Not only is the manufacture involved and the aesthetics unpleasing, prior art cushions require complex mechanical elements to enable the operator to extend or collapse the seat. For example, elastic strips and elaborate tensioning elements may be required to move the individual elements and then maintain them in their desired position.

SUMMARY OF THE INVENTION

The present invention preserves the advantages of the prior art extendable seat cushions. In addition, it provides new advantages not found in currently available extendable seat cushions, and overcomes many of the disadvantages of such currently available cushions.

The invention is generally directed to a novel and unique extendable seat cushion. The preferred embodiment of the present invention is preferably manufactured from a single piece of foam in the desired shape of the cushion with its upper surface covered by a layer of upholstery material such as cloth or vinyl. Portions of the foam member are blanked off or molded at intervals spaced from one another to form channels. Regions adjacent to the layer of cloth and adjacent to the channels are left intact. The removed portions of foam represent channels of the cushion that may be collapsed to decrease its overall length.

The foam and cloth arrangement with portions blanked are disposed on a telescoping plate structure that provides support for the cushion. It is preferable that the plate structure has an upper and lower plate that are disposed in slidable communication with each other. The front portion of the cushion is affixed to the upper plate while the rear portion of the cushion is affixed to the lower plate which is secured to the seat of the vehicle. Sliding the upper plate in one direction causes the cushion to collapse while sliding the upper plate in the reverse direction causes the cushion to extend. A handle is provided on the upper plate to facilitate sliding over the lower plate. Sliding of the upper plate may also be power assisted.

Overall, the extendable seat cushion of the present invention provides a unique combination of advantages not found in prior art cushions. Particularly, the present invention allows manufacture from a single piece of foam covered with cloth, permits easy adjustment and retains an aesthetically pleasing appearance. The expandable seat cushion has applications in many areas which include: truck seats; agricultural seats; construction and equipment seats; office chairs; and automobile seats.

It is therefore an object of the present invention to provide an extendable seat cushion that may be easily collapsed or extended to accommodate operators of varying heights.

Another object of the present invention is to provide an extendable seat cushion that is manufactured from a single unitary member.

It is further object of the present invention to provide an extendable seat cushion that may be quickly and easily collapsed and extended without requiring a multitude of mechanical parts.

It is yet a further object of the present invention to provide an extendable seat cushion that is aesthetically pleasing while retaining the ability to extend and collapse.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 4 is a perspective view of a collapsed seat cushion of FIG. 1 illustrating collapsibility in both lateral and longitudinal directions;

FIG. 5 is a perspective view of an extended seat cushion of FIG. 1 illustrating extendibility in both lateral and longitudinal directions;

FIG. 6 is a perspective cutaway view of a portion of the seat cushion of FIG. 1 in an extended state;

FIG. 7 is a perspective cutaway view of a portion of the seat cushion of FIG. 1 in a collapsed state; and FIG. 8 is a perspective cutaway view of a portion of the seat cushion of FIG. 1 in an extended stated illustrating its interior configuration, FIG. 9 a perspective view of a complete vehicle seat employing the present invention,

DETAILED DESCRIPTION OF THE PREFERRED EMBODIMENT

Figure 1:
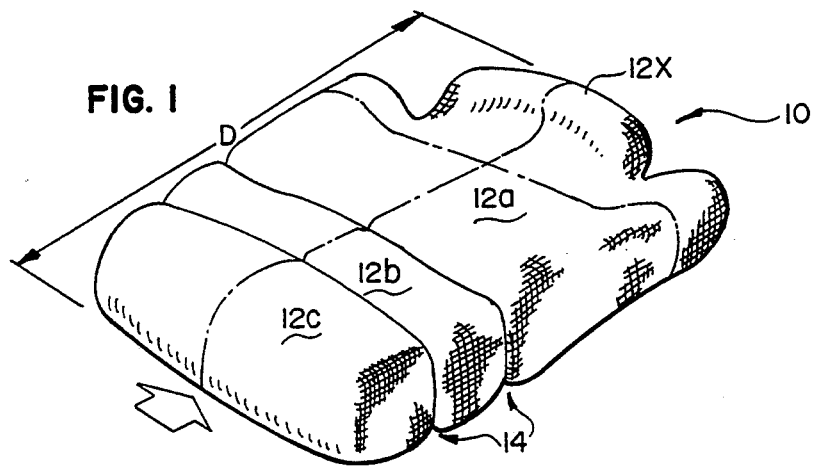
FIG. 1 is a perspective view of the preferred embodiment of the extendable seat cushion of the present invention.

FIG. 1 shows the particularly preferred embodiment of the present invention. The extendable seat cushion 10 is shown generally in FIG. 1 to be a cushion for covering the lower seat portion of a seat but may also be employed for covering the backrest region of a seat. Adjustability of the height of the backrest cushion is desired as well as the length of the lower seat cushion. The description below addresses only application of the present invention for the lower seat cushion, however, it should be understood that the present invention may also be applied to a backrest cushion.

Still referring to FIG. 1, seat cushion 10 is shown to be divided into generally three segments. A rear cushion region 12a is disposed toward the back portion of the seat and is adjacent to a backrest cushion (not shown). Upon construction, section 12x is positioned at the junction between seat cushion 10 and the backrest cushion (not shown). The seat cushion 10 also has a middle region 12b and a front region 12c as separated by grooves 14. As shown in FIG. 1, the distance between three regions, 12a, 12b, and 12c, may be adjusted to change the overall length D of the seat cushion by collapsing the cushion as shown by the arrow. The embodiment in FIG. 1 shows three sections disposed perpendicular to length D, however, the seat cushion 10 may be manufactured with varying numbers of sections in accordance with the particular application. Further, it is preferred that the seat cushion 10 have the ability to extend approximately three inches from a collapsed state or retract approximately three inches from an extended state. A range of only three inches is preferred to accommodate a large cross-section of operators.

Figure 2:
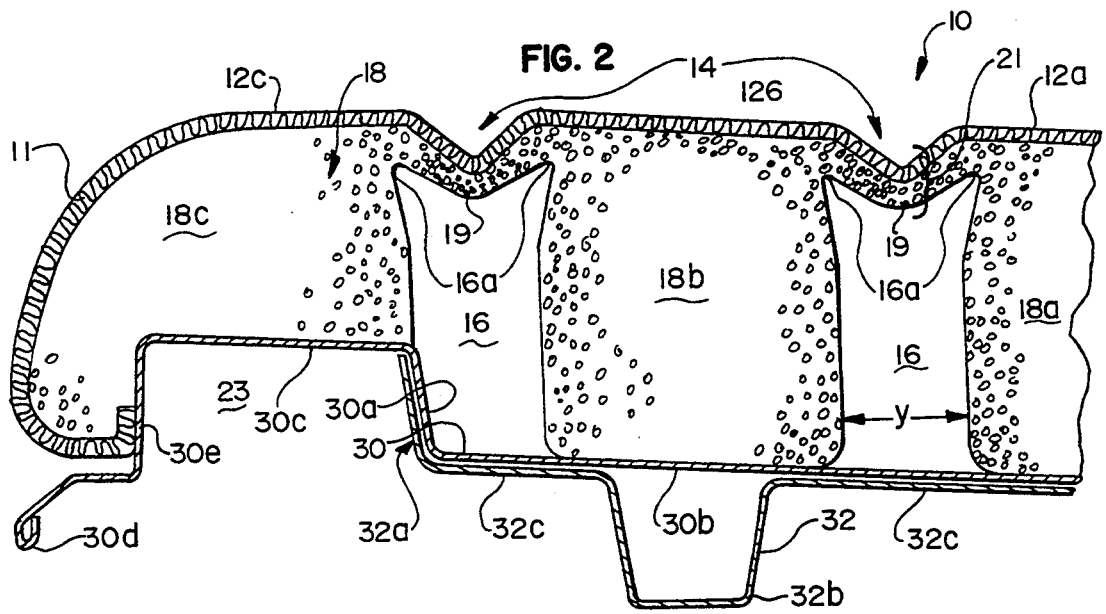
FIG. 2 is a cross-sectional view through line A—A of the extendable seat cushion of FIG. 1 in an extended state.

Turning now to FIG. 2, a cross-section of the seat cushion 10 is shown through the line A—A. The preferred embodiment of the seat cushion 10 is shown in its extended state with three separate regions 12a, 12b, and 12c. The seat cushion 10 is preferably manufactured of a foam rubber cushion generally designated as 18. However, other similar materials, that provide soft cushioning, may be employed instead of foam. Foam member 18 is covered by a layer of cloth 11 or any similar upholstery material such as vinyl. Cloth 11 covers the upper surface of foam layer 18 that is exposed.

Still referring to FIG. 2, foam layer 18 includes regions 18a, 18b, and 18c that correspond to regions 12a, 12b, and 12c shown in FIG. 1. In the extended state of FIG. 2, the foam regions are separated from one another by gaps or channels 16. The distance Y across each gap 16 is preferred to be approximately 1½ inches. Regions 18a, 18b, and 18c are bridged together by connective foam 19 at their uppermost portions. Cloth 11 is affixed to the entire upper surface of each region 18a, 18b, and 18c as well as to the upper surface of connective foam 19. Cloth 11 bridges regions 18a, 18b, and 18c together. Connective foam gives structure to this bridge area.

Figure 3:
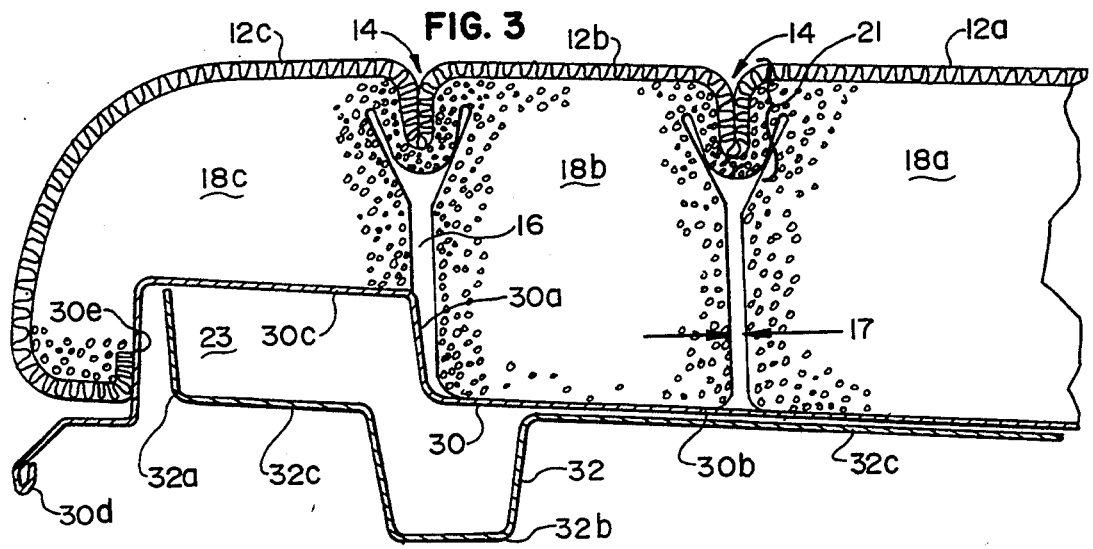
FIG. 3 is a cross-sectional view through line A—A of the extendable seat cushion of FIG. 1 in a collapsed state.

Foam member 18 is manufactured from single piece of foam rubber molded in the expanded or standing position as shown in FIG. 2. This process improves formability and durability while maintaining the appropriate appearance. Since the seat cushion is molded in the expanded or standing position, the seat cushion is naturally in the extended state requiring force to collapse it. Once foam 18 is molded, channels 16 are molded or blanked out while leaving connective foam 19 between each of the respective regions 18a, 18b and 18c. Channels 16 include angular recesses 16a which are molded into the upper areas of foam regions to create a compression hinge 21 of connective foam 19 with cloth 11 disposed directly thereabove. Compression hinge has a generally wide open "V" shape when the seat cushion 10 is in the extended state. During compression of seat cushion 10, the distance Y between respective foam regions is reduced effectively reducing the overall length D of the entire seat cushion 10. For example, foam region 18a is brought closer to foam region 18 thereby reducing distance Y. When this occurs compression hinge 21 begins to bend reducing the area of gap 16 as well as angular recesses 16a. As shown in FIG. 3, compression hinge 21 is completely bent reducing distance Y to a minimal length. Angular recesses 16a are of a shade to provide a home for compression hinge 21 when it is completely bent upon compression of the seat cushion 10. Gap 16 and angular recesses 16a are almost entirely filled causing region 18a to be in close proximity to region 18b. As a result, entire length D will be effectively reduced in proportion to the reduction of length Y between region 18a and 18b, and between region 18b and 18c.

Now referring to FIGS. 2 and 3, telescoping support members are provided to facilitate collapsing and extension of seat cushion 10. An upper support, generally designated as 30, is disposed in direct contact with foam 18 and its respective regions 18a, 18b and 18c. More specifically, upper support includes section 30c which is affixed to foam region 18c while regions 18b and 18a sit on section 30b and are permitted to slide on section 30b. Since foam region 18 is affixed to section 30c, which is elevated relative to section 30b, foam region 18c is of a lesser height to ensure that the surface of the cushion remains uniform. A open region 23 is created by upper support 30. Upper support 30 sits on a lower support, generally designated as 32. Lower support 32 includes section 32c for slidable communication with section 30b of upper support 30. Section 32c is affixed to regions 12a and 12b. Lower support 32 further includes an extension section 32b for connection to a seat support of a vehicle (not shown). Lower support 32 also includes a stop plate 32a for communicating with wall 30a in open region 23.

In operation of the seat cushion 10, the overall length D may be adjusted by telescoping the upper and lower support members. As can be seen in FIG. 2, the seat cushion 10 is in its extended stated. Stop plate 32a is in direct communication with wall 30a. At that point, regions 18a, 18b and 18c are separated from one another by distance Y which is approximately one inch. To effectuate collapsing, handle 30d, which is an extension of upper support 30, is pushed so that section 30b of upper section 30 slides along the surface of section 32c of lower support 32. During such sliding, stop plate 32a passes through open region 23 until it hits wall 30e or when collapsing is complete. Since region 18c is affixed to section 30c of upper support 30 and regions 18a and 18b are not, this sliding action causes collapsing to occur. While is preferred to have simultaneous compression of each of the regions discussed above, it is also possible to collapse the respective cushion regions sequentially.

Similarly, extension of the seat cushion can be effectuated by pulling on handle 30d so that stop plate 32a passes through area 23 until it communicates with wall 30a. At that point, full extension has occurred. It should be appreciated that partial collapsing or partial extension can also be realized with the present invention. The seat cushion 10 of the present invention preferably has a range of compression of approximately three inches but it may be compressed or extended anywhere in the range of no compression all to a full three inch compression. For example, an operator may prefer a one inch compression of the seat cushion. In that situation, stop plate 32a will remain in the central region of area 23.

Upper and lower supports 30 and 32 assist in the compression and extension of the seat cushion 10 as shown in FIG. 1. In particular, the upper and lower support arrangement may be spring biased with reference to the seat support of the vehicle. Further, upper support may be moved over lower support with the assistance of air cylinders with electrical control as opposed to manual movement as discussed above. Further, other mechanical or frictional devices, with or without the use of electrical power, may be used to assist to movement of the upper and lower supports with reference to one another to effectuate compression and extension.

In accordance with the present invention, various modifications may be made to further provide added flexibility in compression and extendibility of seat cushions. As shown in FIG. 4, an alternative embodiment has additional grooves 15a which are shown parallel to the length D of cushion 10. Each of these grooves 15a are similar to grooves 14 that represent compression hinges 21 with channels 16 that run perpendicular to length D. Compression hinges 21 associated with grooves 14 enable seat cushion 10 to compress in a lengthwise direction while compression hinges associated with grooves 15a enable seat cushion 10 to compress in a direction perpendicular to length D. The compression hinges associated with grooves 15a operate to adjust the width of seat cushion 10 in similar fashion to those associated with grooves 14 which adjust the length of seat cushion 10.

Another embodiment of the present invention is shown in FIG. 5. Additional grooves 15b and 15c, representing points of collapsing, are provided to give additional flexibility of compression. These additional grooves 15b and 15c enable the operator to adjust the entire width of the seat cushion independently from adjustment of its overall length. Additional support members, similar to those discussed in conjunction with FIGS. 2 and 3, are employed to control the collapsing and extension of the seat cushion in the lateral direction. Thus, depending on the desired application, a grid of channels 16 may be formed with associated compression hinges to enable compression both in the lateral and longitudinal directions.

Another embodiment of the present invention is illustrated in FIG. 9 which is a perspective view of a complete vehicle seat 50. A seat rest 52 and backrest 54 are provided. The vehicle seat 50 may be manufactured, using the molding process described above, from a single unitary member with channels (not shown) molded or blanked out to form a plurality of segments 58a and 58b. Such segments, which are used for collapsing, may be horizontal in a plane with the seat rest 52, vertical in a plane with backrest 54 or at the junction of the seat rest 52 and backrest 54. The complete seat may be collapsed using a support arrangement similar to that shown in FIGS. 2 and 3. Overall, the present invention may be employed in a number of different applications involving vehicle seats.

To further illustrate the present invention, FIGS. 6, 7 and 8 show perspective views of a portion of the seat cushion 10 in the region of groove 14, with horizontal portion 14a and vertical portion 14b. Groove 14 is representative of any of the grooves discussed above. It is shown how two regions of the seat cushion can be moved relative to one another to effectuate collapsing or extension. FIG. 6 shows, for example, regions 12a and 12b separated from one another representing the seat cushion in the extended state with cloth covering 11. The cross-sectional view of this state can be seen in FIG. 2. Groove portions 14a and 14b are relatively open with compression hinge 21 in an open position. It can be seen from FIG. 8 that channel 16 remains open. Now turning to FIG. 7, cushion regions 12a and 12b are now in closer proximity to one another representing a compressed state. The cross-sectional view of this state can be seen in FIG. 3. Groove portions 14a and 14b are now closed with compression hinge 21 bent with connective foam and cloth 11 thereon residing in angular recesses 16a. In this state, channel 16 is substantially closed.

In the present invention, an extendable and collapsible seat cushion can be simply and easily manufactured from a single piece of molded foam by molding out the channels 16 in accordance with the desired application. Such manufacture from a single piece of foam is desirable to take advantage of its formability and durability while maintaining the appropriate appearance. The design of the present invention is flexible, while it is preferred to have channels 16 parallel, they may be arranged to suit the application. The seat cushion requires few mechanical parts to provide collapsibility. Since the present invention may be manufactured from a foam seat without completely redesigning it to enable extendibility, aesthetics of the seat cushion can be maintained.

It will be appreciated by those skilled in the art that various changes and modifications can be made to the illustrated embodiments without departing from the spirit of the present invention. All such modifications and changes are intended to be covered by the appended claims.

What is claimed is:

1. An extendable and collapsible cushion comprising:
   a unitary cushion member of flexible foam material having an upper surface and a lower surface;
   at least one channel of a depth less than the thickness of said unitary cushion member, said channel being disposed in the lower surface of said cushion member to divide said unitary member into a plurality of cushion segments;
   a compression hinge bridging said channel and connecting adjacent cushion segments; and
   said plurality of segments being movable relative to one another to open or close said hinge and to thereby adjustably extend or collapse said cushion member and said hinge being configured so that said hinge folds into said channel when said cushion member is collapsed.

2. The cushion of claim 1, further comprising:
a layer of upholstery material disposed on the upper surface of said unitary cushion member.

3. The cushion of claim 2, wherein said upholstery material is a cloth.

4. The cushion of claim 2, wherein said upholstery material is vinyl.

5. The cushion of claim 1, wherein said channel includes an angular recess to facilitate the folding of said hinge when said cushion member is compressed.

6. The cushion of claim 1, wherein said cushion is employed as an extendable and collapsible cushion for a generally horizontal seat portion of a seat.

7. The cushion of claim 1, wherein said cushion is employed as an extendable and collapsible cushion for a generally vertical backrest portion of a seat.

8. The cushion of claim 1, wherein said at least one channel is disposed substantially perpendicular to said two sides of said cushion to permit adjustment of said cushion.

9. The cushion of claim 1, wherein said at least one channel is disposed substantially parallel to said two sides of said cushion to permit adjustment of the width cushion.

10. An extendable and collapsible cushion comprising:
a unitary cushion member of flexible foam material having an upper surface and a lower surface;
at least one channel of a depth less than the thickness of said unitary cushion member, said channel being disposed in the lower surface of said unitary member to divide said unitary cushion member into a plurality of cushion segments;
a compression hinge bridging said channel and connecting adjacent cushion segments;
said plurality of segments being movable relative to one another to open or close said hinge and to thereby adjustably extend or collapse said cushion member, and said hinge being configured so that said hinge folds into said channel when said cushion member is collapsed;
a first sliding member connected to said lower surface of said unitary cushion member; and,
a second sliding member slidably engaging said first sliding member, wherein said first sliding member is movable relative to said second sliding member to extend or collapse said cushion member.

11. The cushion of claim 10, wherein one of said sliding members includes a handle to facilitate movement of said first sliding member relative to said second sliding member.

12. The cushion of claim 10, further comprising: powered actuator for moving said first sliding member relative to said second sliding member.

13. An extendable and collapsible cushion, comprising:
a unitary cushion member of flexible foam material having an upper surface and a lower surface, a front, a back and two sides;
at least one channel of a depth less than the thickness of said unitary cushion member, said channel being disposed in the lower surface of said unitary member to divide said unitary member into a plurality of segments;
a compression hinge bridging said channel and connecting adjacent cushion segments, said plurality of segments being movable relative to one another to open or close said hinge and to thereby extend or collapse said cushion member, and said compression hinge being configured so that said hinge folds into said channel when said cushion member is collapsed; and
wherein at least one channel is disposed substantially perpendicular to said two sides of said cushion member and at least one channel is disposed substantially parallel to said two sides of said cushion member to permit adjustment of said cushion member.

14. An extendable and collapsible cushion comprising:
a unitary cushion member of flexible foam material having an upper surface and a lower surface, a front, a back and two sides;
at least one channel of a depth less than the thickness of said unitary cushion member, said channel being disposed in the lower surface of said cushion member to divide said unitary member into a plurality of cushion segments;
a compression hinge bridging said channel and connecting adjacent cushion segments; and
said plurality of segments being movable relative to one another to open or close said hinge and to thereby adjustably extend or collapse said cushion member and said hinge being configured so that said hinge folds into said channel when said cushion member is collapsed.

* * * * *